United States Patent
Rhie et al.

(10) Patent No.: US 8,331,443 B2
(45) Date of Patent: Dec. 11, 2012

(54) SYSTEMS AND METHODS FOR VIDEO QUALITY MEASUREMENT USING AUXILIARY INFORMATION OF CODEC

(75) Inventors: Sang-Woo Rhie, Seoul (KR); Chul-Hee Lee, Seoul (KR); Sang-Ho Chae, Uiwang-si (KR); Hyun-Joong Park, Seoul (KR); Joong-Yun Lee, Seoul (KR)

(73) Assignees: SK Planet Co., Ltd., Seoul (KR); Industry-Academic Cooperation Foundation, Yonsei University, Seoul (KR)

( * ) Notice: Subject to any disclaimer, the term of this patent is extended or adjusted under 35 U.S.C. 154(b) by 1274 days.

(21) Appl. No.: 11/915,810

(22) PCT Filed: May 30, 2006

(86) PCT No.: PCT/KR2006/002076
§ 371 (c)(1),
(2), (4) Date: Apr. 16, 2008

(87) PCT Pub. No.: WO2006/129955
PCT Pub. Date: Dec. 7, 2006

(65) Prior Publication Data
US 2008/0198922 A1  Aug. 21, 2008

(30) Foreign Application Priority Data
May 30, 2005  (KR) .................. 10-2005-0045399

(51) Int. Cl.
*H04N 7/12* (2006.01)
(52) U.S. Cl. ......... 375/240.08; 375/240.01; 375/240.25; 375/240.26
(58) Field of Classification Search ............. 375/240.08, 375/240.01, 240.25, 240.26
See application file for complete search history.

(56) References Cited

U.S. PATENT DOCUMENTS

| | | | | |
|---|---|---|---|---|
| 5,687,095 A | * | 11/1997 | Haskell et al. | 348/386.1 |
| 5,841,470 A | * | 11/1998 | Welsh | 375/240.1 |
| 6,239,834 B1 | * | 5/2001 | Miyaji et al. | 348/193 |
| 7,143,328 B1 | * | 11/2006 | Altmann | 714/746 |

(Continued)

FOREIGN PATENT DOCUMENTS
JP  2000-341688  12/2000
(Continued)

OTHER PUBLICATIONS
Supplementary European Search Report for EP06747477, citing the above reference(s).
(Continued)

*Primary Examiner* — Ricky Ngo
*Assistant Examiner* — Dewanda Samuel
(74) *Attorney, Agent, or Firm* — Lowe Hauptman Ham & Berner, LLP

(57) ABSTRACT

A system for evaluating video quality using auxiliary information of a codec includes a video transmitter that includes a source video input unit for inputting source video, an encoding unit for encoding the input source video, a decoding unit for decoding encoded video data, and a video quality evaluation unit for evaluating video quality using the decoded video data. The encoding unit transmits auxiliary information required for video quality evaluation, among information acquired in an encoding procedure, to the video quality evaluation unit. The video quality evaluation unit evaluates video quality using the decoded video data received from the decoding unit, and the auxiliary information received from the encoding unit.

18 Claims, 9 Drawing Sheets

U.S. PATENT DOCUMENTS

| | | | |
|---|---|---|---|
| 7,197,156 B1 * | 3/2007 | Levy | 382/100 |
| 7,869,517 B2 * | 1/2011 | Ghanbari | 375/240.16 |
| 2005/0053288 A1 * | 3/2005 | Srinivasan et al. | 382/233 |
| 2005/0243910 A1 * | 11/2005 | Lee et al. | 375/240.01 |
| 2006/0215768 A1 * | 9/2006 | Kerofsky | 375/240.28 |

FOREIGN PATENT DOCUMENTS

| | | |
|---|---|---|
| JP | 2002528008 | 8/2002 |
| JP | 2005510098 | 4/2005 |
| WO | 2004/054274 | 6/2004 |

OTHER PUBLICATIONS

Reibman, A.R. et al.; "Low complexity quality monitoring of MPEG-2 video in a network"; "Image Processing, 2003. ICIP 2003. Proceedings. 2003 International Conference on"; Sep. 14-17, 2003; on pp. III-261-III-264 vol. 2; 1 page.

Mike Knee; "Picture Appraisal Rating"; "(PAR)—A Single-ended Picture Quality Measure for MPEG-2"; Snell & Wilcox Limited; 2006; 8 pages.

Jun Okamoto et al.; "A Study on Objective Video Quality Measurement Method Considering Characteristics of Reference Video"; IEICE technical support; Sep. 4, 2003; vol. 103; 2 pages.

Japanese Office Action for 2008-514547 dated Aug. 5, 2011, citing the above reference(s).

* cited by examiner

SYSTEMS AND METHODS FOR VIDEO QUALITY MEASUREMENT USING AUXILIARY INFORMATION OF CODEC

CROSS REFERENCE TO RELATED APPLICATION

This application is the National Phase application of International Application No. PCT/KR2006/002076, filed May 30, 2006, which designates the United States and was published in English. This application, in its entirety, is incorporated herein by reference.

TECHNICAL FIELD

The present invention relates, in general, to a system and method for evaluating video quality using auxiliary information of a codec and, more particularly, to a system and method for evaluating video quality using auxiliary information of a codec, which can objectively evaluate video quality using information acquired by an encoder or a decoder, such as bit rate, motion amount, codec characteristics, residual error, blocking level, bit error, packet loss, delay or jitter.

BACKGROUND ART

Evaluation of video quality is a core technology required for the evaluation of the transmission quality of a video, as well as verifying the performance of a video codec and developing new compression coding techniques. In particular, with the development of digital technology and communication technology, technology for digitizing video and transmitting the video over a network has appeared. In the system for transmitting video compressed using such digital technology, the importance of the objective evaluation of video quality has been further emphasized.

Further, technology for objectively evaluating video quality can also be used in the evaluation of video quality for mobile phones, as well as for televisions. The technology, which is a core technology required to verify the performance of a video codec, develop a new compression coding technique, or evaluate transmission quality, is very important in that it can be utilized when evaluating digital broadcasting transmission quality, developing related equipment, such as camcorders, video players or digital cameras, and evaluating the performance thereof.

Meanwhile, in a conventional system for objectively evaluating video quality, a video quality evaluation device is generally operated independently of a video codec at the time of evaluating video quality. For example, in the conventional video quality evaluation system, if a reference video and a degraded video are provided to the video quality evaluation device, the video quality evaluation device evaluates video quality using a method of evaluating the video quality of the degraded video.

However, in most cases, the encoder or decoder of a video codec can be operated in cooperation with an objective video quality evaluation device. If auxiliary information, which can be provided by the encoder or decoder of the video codec, is used, the performance of an objective video quality evaluation method can be improved, but a method of utilizing information about the codec for video quality evaluation has not yet been proposed.

DISCLOSURE OF THE INVENTION

Accordingly, the present invention has been made keeping in mind the above problems occurring in the prior art and an object of the present invention is to provide a system and method for evaluating video quality using auxiliary information of a codec, which can be provided by the encoder or decoder of a video codec, thus improving the performance of an objective video quality evaluation method.

BEST MODE FOR CARRYING OUT THE INVENTION

Figure 1A:
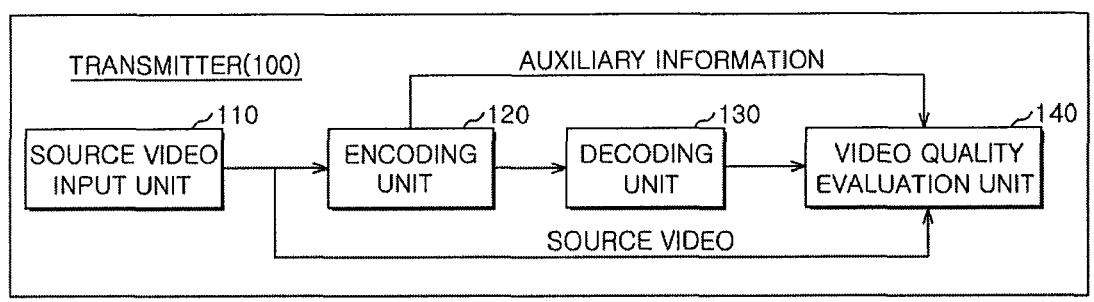
FIGS. 1A to 1C are diagrams showing the construction of a transmitting-side video quality evaluation system according to an embodiment of the present invention.

In accordance with an aspect of the present invention to accomplish the above object, a system is provided for evaluating video quality using auxiliary information of a codec, the system comprising a video transmitter that includes a source video input unit for inputting source video, an encoding unit for encoding the input source video, a decoding unit for decoding encoded video data, and a video quality evaluation unit for evaluating video quality using the decoded video data, wherein the encoding unit transmits auxiliary information required for video quality evaluation, among information acquired in an encoding procedure, to the video quality evaluation unit, and the video quality evaluation unit evaluates video quality using the decoded video data received from the decoding unit, and the auxiliary information received from the encoding unit.

In accordance with another aspect of the present invention to accomplish the above object, a system is provided for evaluating video quality using auxiliary information of a codec the system comprising a video receiver that includes a received data input unit for receiving encoded video data over a network from a video transmitter, a decoding unit for generating received video by decoding the encoded video data, and a video quality evaluation unit for evaluating video quality using the decoded video, wherein the decoding unit transmits auxiliary information required for video quality evaluation, among information acquired in a decoding procedure, to the video quality evaluation unit, and the video quality evaluation unit evaluates video quality using the decoded video and the auxiliary information, which are received from the decoding unit.

In accordance with a further aspect of the present invention to accomplish the above object, a method of evaluating video quality is provided using auxiliary information of a codec in a video transmitter that includes a source video input unit, an encoding unit, a decoding unit, and a video quality evaluation unit for evaluating video quality using decoded video data on a receiving side, the method comprising a first step of the source video input unit providing source video to the encoding unit, a second step of the encoding unit encoding the source video, transmitting encoded video data to the decoding unit, and transmitting auxiliary information required for video quality evaluation, among information acquired in an encoding procedure, to the video quality evaluation unit, a third step of the decoding unit decoding the encoded video data and transmitting the decoded video to the video quality evaluation unit; and a fourth step of the video quality evaluation unit evaluating video quality using the decoded video and the auxiliary information.

In accordance with yet another aspect of the present invention to accomplish the above object, a method of evaluating video quality is provided using auxiliary information of a codec in a video receiver that includes a received data input unit, a decoding unit, and a video quality evaluation unit for evaluating video quality using decoded video data. Encoded video data is received from a video transmitter over a network, and the video quality is evaluated, the method comprising a first step of the received data input unit providing the encoded video data received over the network to the decoding unit; a second step of the decoding unit generating received video by decoding the encoded video data, and transmitting auxiliary information required for video quality evaluation, among information acquired in a decoding procedure, to the video quality evaluation unit, together with the received video; and a third step of the video quality evaluation unit evaluating video quality using the decoded video and the auxiliary information, which are received from the decoding unit.

Meanwhile, the term "auxiliary information of a codec" in the present invention means information useful for video quality evaluation among the information acquired in an encoding procedure or a decoding procedure. The auxiliary information in the encoding procedure includes codec type information (for example, Moving Picture Experts Group 2 [MPEG2], MPEG4, H.263, H.264, etc.), bit rate, Frames Per Second (FPS), blocking level indicating discontinuity between adjacent blocks, motion amount, residual error information, etc. Further, the auxiliary information in the decoding procedure includes codec type information, bit rate, Frames Per Second (FPS), block location information, blocking level indicating discontinuity between adjacent blocks, motion amount, transmission bit information for each frequency, residual error information, transmission error information (bit error information, packet loss information, delay information, jitter information, etc.), etc.

The above and other objects, features and other advantages of the present invention will be more clearly understood from the following detailed description taken in conjunction with the accompanying drawings.

Figure 1B:
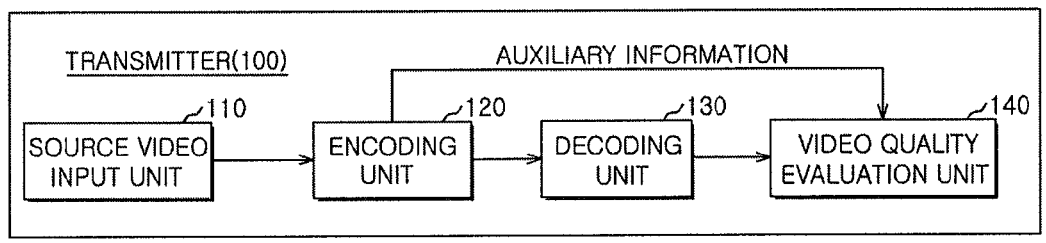
Figure 1C:
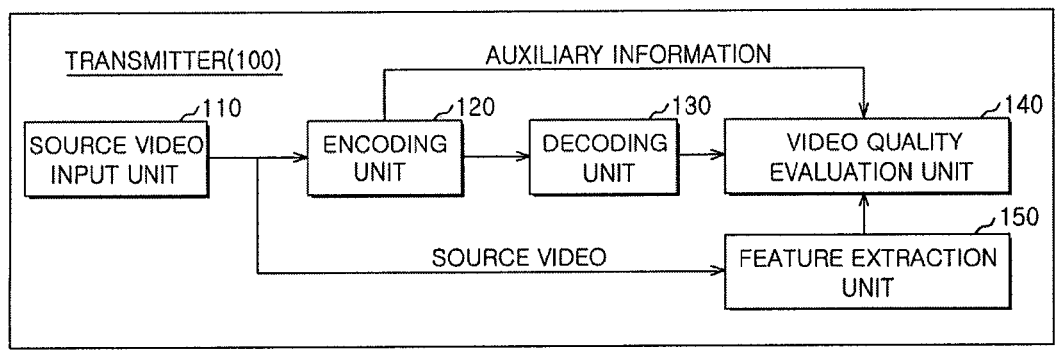

FIGS. 1A to 1C are diagrams showing the construction of a transmitting-side video quality evaluation system according to an embodiment of the present invention, which show a video transmitter for evaluating the video quality of encoded video on the transmitting side. FIGS. 1A to 1C illustrate schemes using a full-reference method, a no-reference method, and a reduced-reference method, respectively. If no transmission error occurs, the video quality of the received video is identical to that of the encoded video.

As shown in FIG. 1A, a transmitter 100 for evaluating video quality based on the full-reference method according to the present invention includes a source video input unit 110, an encoding unit 120, a decoding unit 130, and a video quality evaluation unit 140, and performs video quality evaluation using both reference video and processed video.

The source video input unit 110 inputs original video (source video), and may be implemented using an input device for receiving video from an external device, or a predetermined device for storing video in advance.

The encoding unit 120 encodes (compresses) the source video and provides the encoded video data to the decoding unit 130. In the present invention, in order to utilize codec information for evaluating video quality, the encoding unit 120 provides auxiliary information useful for video quality evaluation, among information acquired in an encoding procedure, to the video quality evaluation unit 140.

In this case, the auxiliary information may include codec type information, bit rate, Frames Per Second (FPS), blocking level indicating discontinuity between adjacent blocks, motion amount, residual error information, etc.

The relationship between the auxiliary information of the encoding unit 120 and video quality evaluation is described below.

First, since video quality at the same bit rate varies greatly according to codec type, information about a codec is very useful for video quality evaluation. Further, bit rate is information enabling the prediction of overall video quality, and information about the bit rate, variously assigned to each frame, may be important information in the prediction of locally varying video quality.

Further, when the number of Frames Per Second (FPS) is low, motion seems unnatural, so that FPS becomes an important factor with respect to video quality degradation. When video is encoded using FPS lower than that of the source video, information about the location of encoded frames on a temporal axis can also be important information in video quality evaluation, and is thus transmitted to the video quality evaluation unit 140.

Further, information about blocking level is a very important factor causing video quality degradation, but it is not easy to calculate blocking level from degraded video. Especially, in the latest codec, since the block size varies, it is very difficult to find the boundary between blocks. However, the encoding unit 120 can precisely detect the location of a block, and precisely predict the blocking level, thus the encoding unit 120 transmits information about a predicted blocking level to the video quality evaluation unit 140, thus enabling the precise prediction of video quality. If a de-blocking technique is used, information about the de-blocking is also transmitted to the video quality evaluation unit 140.

Further, even if respective video data have the same bit rate, the quality of encoded video data greatly varies according to video content. That is, video with less motion provides relatively high video quality even at a low bit rate, but video with a lot of motion may cause video quality deterioration even at a high bit rate due to the motion amount. Therefore, information about such motion amount is also transmitted to the video quality evaluation unit 140.

Further, the encoding unit 120 can acquire precise information about the residual error of each block after encoding is performed, and can calculate the error for each frequency region. Such information is very useful for predicting a blocking level at a low bit rate or to predict a fine error at a high bit rate. Accordingly, the encoding unit 120 transmits residual error information, including a residual error for each frequency, to the video quality evaluation unit 140.

Next in order to evaluate video quality on the receiving side, which receives the encoded video data from the transmitter 100 over a network, the decoding unit 130 decodes the encoded video data, and outputs video which will be acquired by the receiver for receiving the encoded video data through a decoding procedure.

The video quality evaluation unit 140 predicts video quality on the receiving side using the video received from the decoding unit 130, the source video received from the source video input unit 110, and various auxiliary information received from the encoding unit 120.

Meanwhile, in the present invention, the video quality evaluation unit 140 evaluates video quality using various methods, such as a full-reference method, a reduced-reference method, and a no-reference method, and may further include some additional components depending on the video quality evaluation method.

That is, when the no-reference method is used, the video quality evaluation unit 140 does not receive source video from the source video input unit 110, as shown in FIG. 1B. That is, the video quality evaluation unit 140 of FIG. 1B evaluates video quality using only video processed through the decoding procedure without using any information about the reference video. Such a method is used to analyze a bit stream included in Moving Picture Experts Group 2, Transport Stream (MPEG-2 TS), and to evaluate video quality.

Further, when a reduced-reference method is used, the transmitter 100 further includes a feature extraction unit 150, as shown in FIG. 1C. The video quality evaluation unit 140 receives only parameters, extracted from the source video, from the feature extraction unit 150 without directly receiving the source video from the source video input unit 110, thus evaluating video quality by comparing the parameters.

Figure 2A:
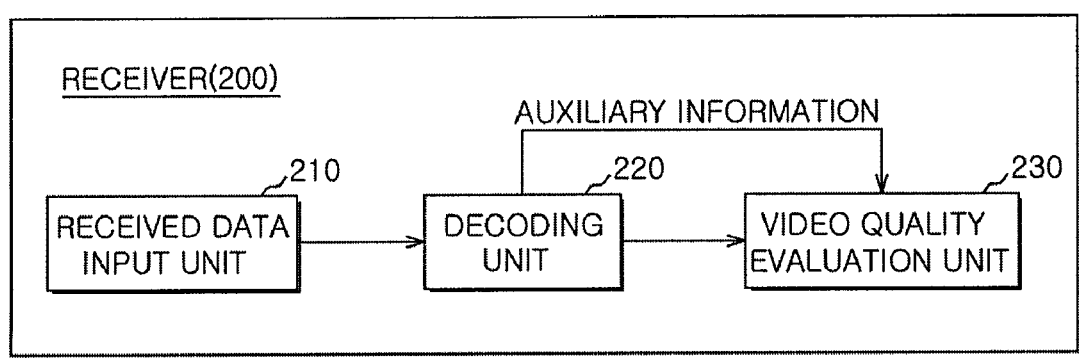
FIGS. 2A to 2C are diagrams showing the construction of a receiving-side video quality evaluation system according to another embodiment of the present invention.
Figure 2B:
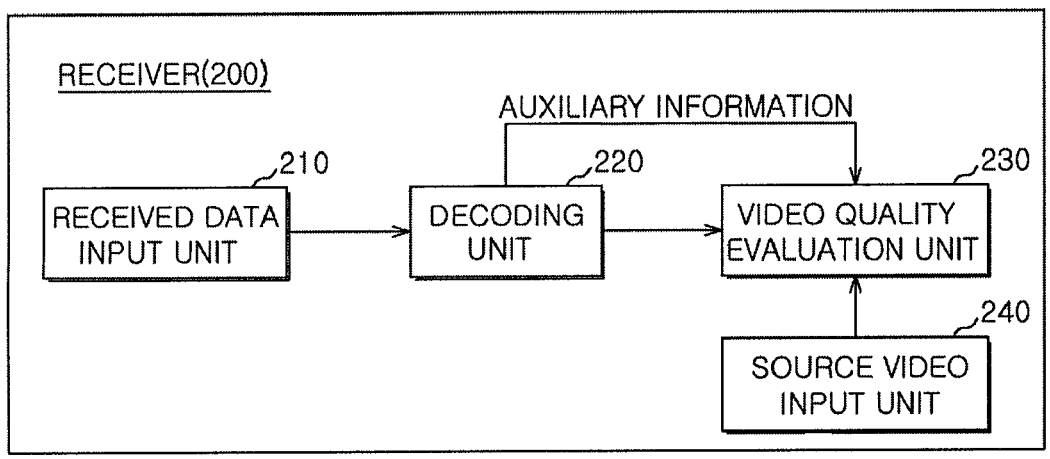
Figure 2C:
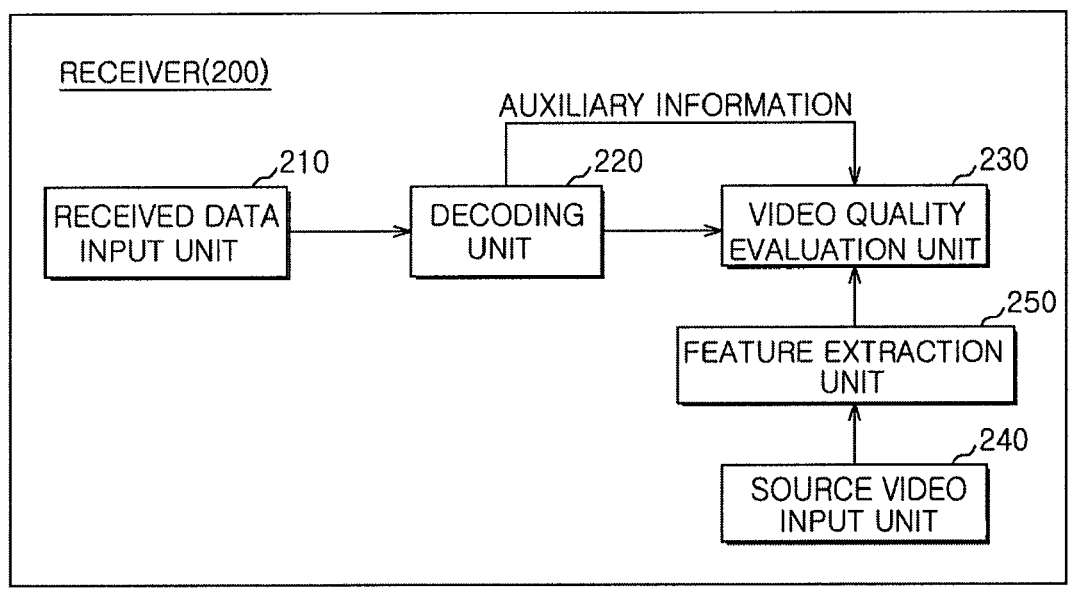

Next FIGS. 2A to 2C are diagrams showing the construction of a receiving-side video quality evaluation system according to another embodiment of the present invention, which show the construction of a video receiver allowing the receiving side to evaluate video quality. FIGS. 2A to 2C illustrate schemes using a no-reference method, a full-reference method and a reduced-reference method, respectively.

As shown in FIG. 2A, the video receiver 200 includes a received data input unit 210, a decoding unit 220, and a video quality evaluation unit 230.

The received data input unit 210 receives video, encoded by the video transmitter, over a network, and transmits the encoded video data to the decoding unit 220.

The decoding unit 220 generates received video by decoding the encoded video data, and transmits the received video to the video quality evaluation unit 230. Further, in the present invention, in order to use information acquired in the decoding procedure for video quality evaluation, the decoding unit 220 transmits auxiliary information required for video quality evaluation, among the information acquired in the decoding procedure, to the video quality evaluation unit 230.

In this case the auxiliary information may include codec type information, bit rate, Frames Per Second (FPS), the location of each frame on a temporal axis, block location information, blocking level indicating discontinuity between adjacent blocks, motion amount, transmission bit information for each frequency, residual error information, transmission error information (bit error information, packet loss information, delay information, jitter information, etc.), etc.

The relationship between the auxiliary information of the decoding unit 220 and video quality evaluation is described below.

First, similar to the encoding procedure, video quality at the same bit rate varies greatly according to codec type, so that information about the codec is very useful in video quality evaluation. The bit rate is information enabling the prediction of overall video quality, and information about the bit rate, variously assigned to each frame, may be important information in the prediction of locally varying video quality.

Further, when FPS is low, motion seems unnatural, thus FPS is an important factor with respect to video quality degradation. When video is encoded using FPS lower than that of the source video, information about the location of encoded frames on a temporal axis can also be important information in video quality evaluation and is thus transmitted to the video quality evaluation unit 230.

Further, information about the blocking level is a very important factor in the deterioration of perceived video quality, but it is not easy to calculate the blocking level from degraded video. In particular, in the latest codec, since the block size varies, it is very difficult to find the boundary between blocks. However, the decoding unit 220 can precisely detect the location of a block, and precisely predict the blocking level. Accordingly, the decoding unit 220 transmits information about the predicted blocking level to the video quality evaluation unit 230, together with block location information, thus precisely predicting video quality.

Further, even if respective video data have the same bit rate, the quality of encoded video data varies greatly depending on the content of the video. That is, video with less motion can provide relatively high video quality even at a low bit rate, but video with a lot of motion may cause video quality deterioration even at a high bit rate due to the motion amount.

Further, the calculation of residual error for each frequency by the decoding unit 220 is possible only when source video is provided. However, even if no source video exist which is a reference, the decoding unit 220 can calculate a transmission energy for each frequency, and transmit information about the transmission energy to the video quality evaluation unit 230, thus improving the performance of video quality evaluation.

Further, transmission error information, such as bit error, packet loss, delay, or jitter, is an important factor in video quality evaluation. The decoding unit 220 transmits information about any transmission error to the video quality evaluation unit 230, thus enabling the precise evaluation of video quality.

Meanwhile, the video quality evaluation unit 230 according to the present invention can evaluate video quality using various methods, such as a full-reference method, a reduced-reference method or a no-reference method. The receiver 200 may further include some additional components depending on the video quality evaluation method.

That is, when the full-reference method is used, the receiver 200 further includes a source video input unit 240, as shown in FIG. 2B. The video quality evaluation unit 230 receives source video from the source video input unit 240. Therefore, the video quality evaluation unit 230 of FIG. 2B evaluates video quality using the received video and the source video.

Further, when the reduced-reference method is used, the receiver 200 further includes a source video input unit 240 and a feature extraction unit 250, as shown in FIG. 2C. The source video input unit 240 provides the source video to the feature extraction unit 250, and the feature extraction unit 250 extracts parameters required for video quality evaluation from the source video, and transmits the parameters to the video quality evaluation unit 230. Therefore, the video quality evaluation unit 230 receives only parameters extracted from the source video from the feature extraction unit 250, and evaluates video quality by comparing the parameters.

Figure 3:
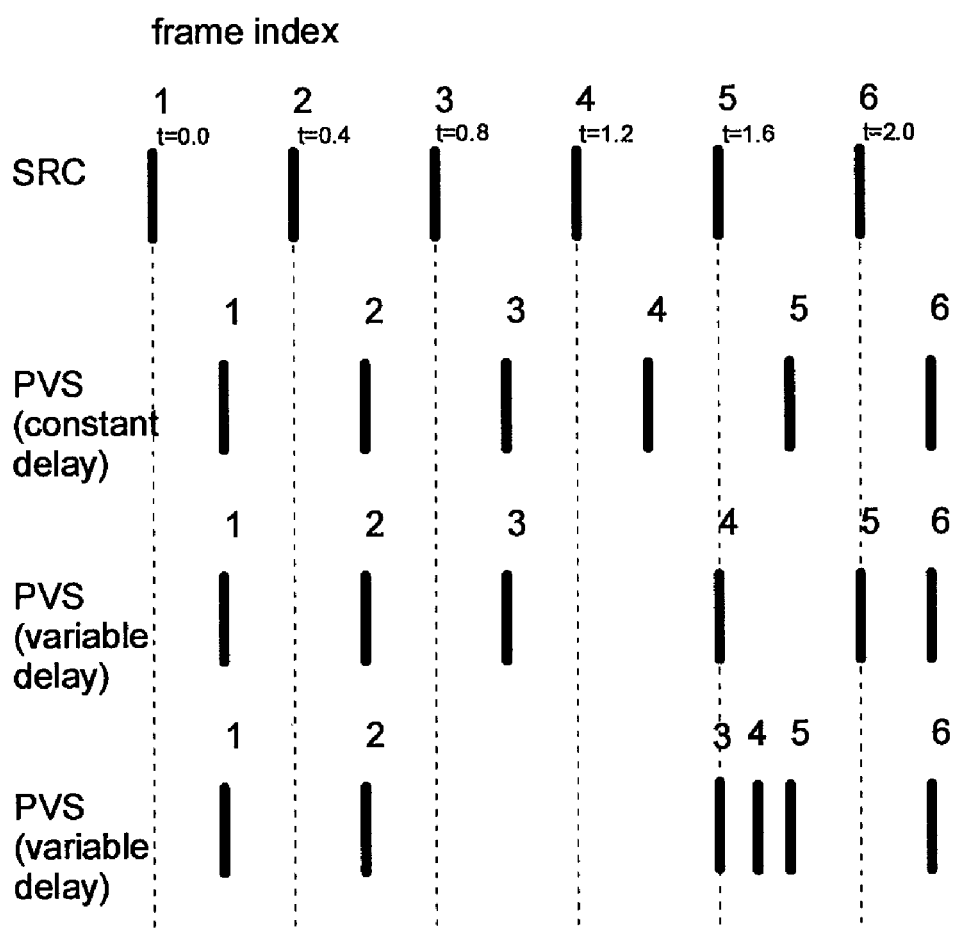
FIG. 3 is a diagram showing an example in which decoded video is played at an incorrect time due to transmission error.

FIG. 3 is a diagram showing an example in which decoded video is played at an incorrect time due to transmission error. The decoding unit 220 can relatively easily extract information about such an error on the temporal axis, and transmit the extracted error information to the video quality evaluation unit 230, thus enabling the evaluation of video quality to be precisely performed.

Therefore, the video quality evaluation unit 230 according to the present invention evaluates video quality using the decoded video and various auxiliary information, which are received from the decoding unit 220.

Figure 4:
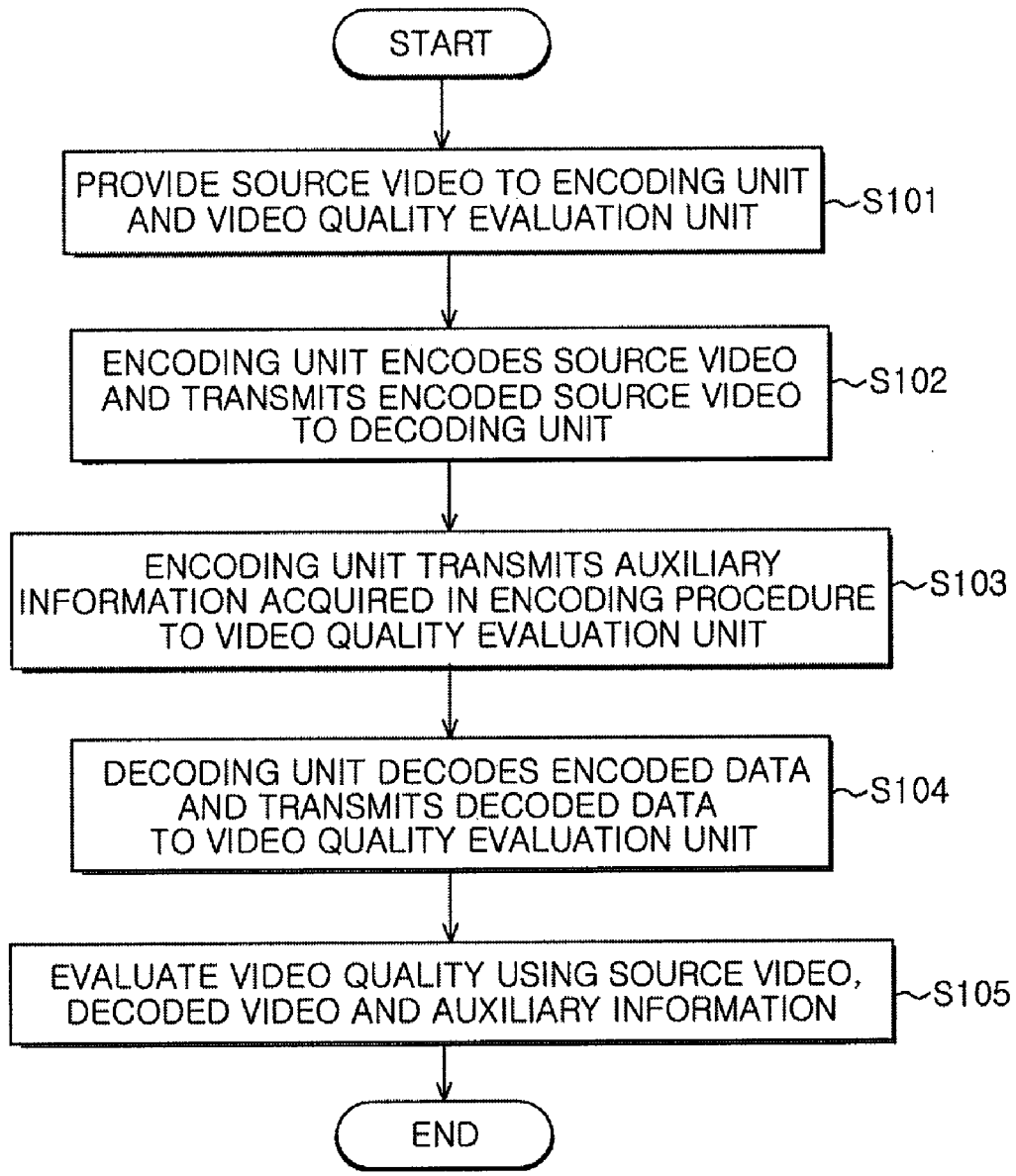
FIG. 4 is a flowchart of a transmitting-side video quality evaluation method according to an embodiment of the present invention.

FIG. 4 is a flowchart of a transmitting-side video quality evaluation method according to an embodiment of the present invention, which shows the process of evaluating video quality in the transmitter according to the embodiment of FIG. 1A.

As shown in the drawing, the source video input unit 110 of the transmitter 100 provides source video both to the encoding unit 120 and to the video quality evaluation unit 140 at step S101.

The encoding unit 120 encodes the source video received from the source video input unit 110 and transmits the encoded source video to the decoding unit 130 at step S102. Auxiliary information, acquired in the encoding procedure, is transmitted to the video quality evaluation unit 140 at step S103. The auxiliary information has been described with reference to FIG. 1, so a detailed description thereof is omitted.

Next, the decoding unit 130 transmits video, obtained by decoding the encoded data, to the video quality evaluation unit 140 at step S104. The video quality evaluation unit 140 evaluates video quality on the receiving side, using the source video received at step S101, the auxiliary information received at step S103, and the decoded video received at step S104, at step S105.

Meanwhile, the above embodiment is related to the process of evaluating video quality based on the full-reference method of FIG. 1A. If video quality is evaluated based on the no-reference method of FIG. 1B, the source video input unit 110 provides the source video only to the encoding unit 120 at step S101. The video quality evaluation unit 140 evaluates video quality using only the auxiliary information and the decoded video at step S105. Further, if video quality is evaluated based on the reduced-reference method of FIG. 1C, the source video input unit 110 provides the source video both to the encoding unit 120 and to the feature extraction unit 150. At step S105, the video quality evaluation unit 140 receives feature parameters from the feature extraction unit 150 and evaluates video quality using the auxiliary information, the decoded video and the feature parameters.

Figure 5:
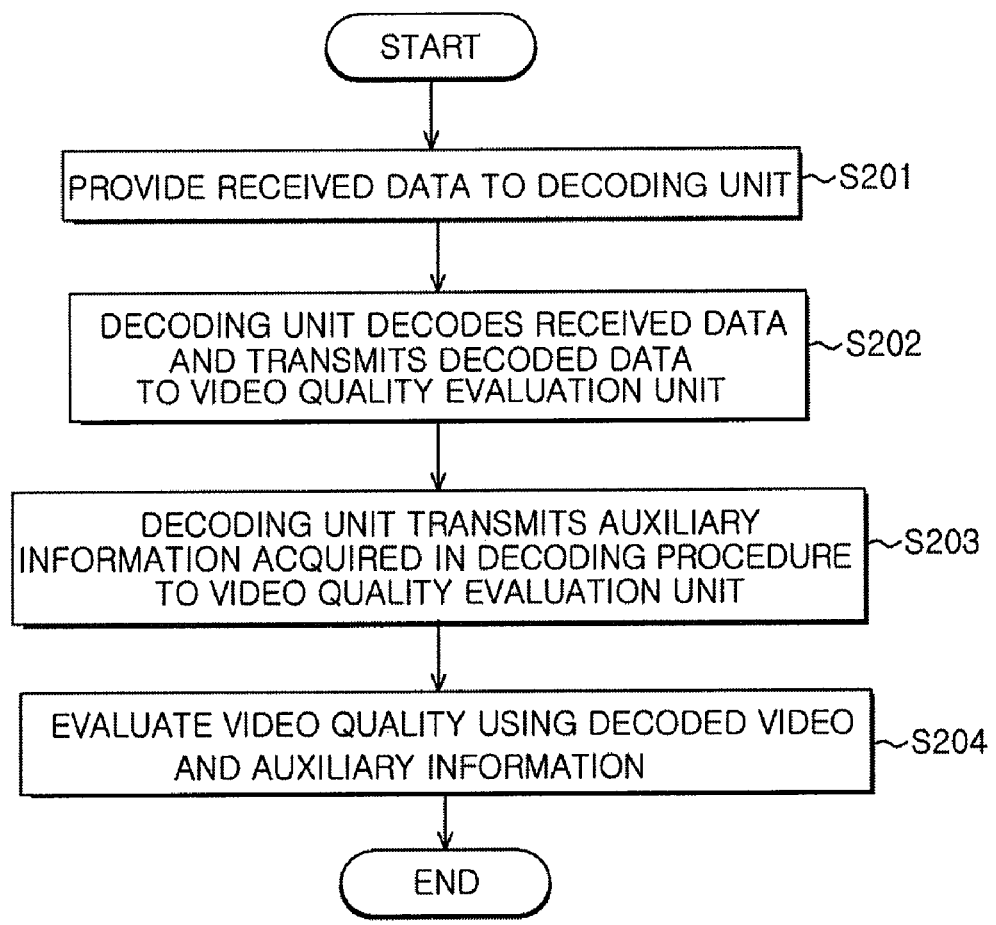
FIG. 5 is a flowchart of a receiving-side video quality evaluation method according to another embodiment of the present invention.

Next FIG. 5 is a flowchart of a receiving-side video quality evaluation method according to another embodiment of the present invention, which shows the process of evaluating video quality in the receiver according to the embodiment of FIG. 2A.

As shown in the drawing, when the received data input unit 210 of the video receiver 200 provides encoded video data, received over the network to the decoding unit 220 at step S201, the decoding unit 220 decodes the received data, and transmits the decoded video to the video quality evaluation unit 230 at step S202.

Further, the decoding unit 220 transmits auxiliary information required for video quality evaluation, among the information acquired in the decoding procedure, to the video quality evaluation unit 230, together with the decoded video, at step S203. The auxiliary information has been described with reference to FIG. 2, so a detailed description thereof is omitted.

The video quality evaluation unit 230 evaluates video quality using the decoded video and the auxiliary information, which are received from the decoding unit 220 at step S204. One of the important objects for evaluating video quality on the receiving side is to monitor the video quality of the transmitting side, thus the video quality evaluation unit 230 preferably provides the results of video quality evaluation to the transmitter.

Meanwhile, the above embodiment is related to the process of evaluating video quality based on the no-reference method of FIG. 2A. If video quality is evaluated based on the full-reference method of FIG. 2B, the video quality evaluation unit 230 evaluates video quality using the auxiliary information, the decoded video, and the source video, which is received from the source video input unit 240, at step S204. Further, if video quality is evaluated based on the reduced-reference method of FIG. 2C, the video quality evaluation unit 230 receives feature parameters from the feature extraction unit 250, and evaluates video quality using the auxiliary information, the decoded video, and the feature parameters at step S204.

Those skilled in the art will appreciate that the present invention can be implemented as other embodiments, without departing from the technical spirit and essential features of the invention, so that the above embodiments are only exemplary, and are not limiting. The scope of the present invention is defined by the accompanying claims rather than the detailed description. All changes or modifications that can be derived from the meaning and scope of the claims and equivalent concepts thereof should be interpreted as being included in the scope of the present invention.

INDUSTRIAL APPLICABILITY

Accordingly, the present invention provides a system and method for evaluating video quality using auxiliary information of a codec, which utilize auxiliary information that can be provided by the encoder or decoder of a video codec, for video quality evaluation, thus improving the performance of objective video quality evaluation.

The invention claimed is:

1. A system for evaluating video quality using auxiliary information of a codec, the system comprising a video transmitter that includes a source video input unit configured to input source video, an encoding unit configured to encode the input source video, a decoding unit configured to decode encoded video data, and a video quality evaluation unit configured to evaluate video quality using the decoded video data, wherein:

the encoding unit transmits the auxiliary information required for video quality evaluation, among information acquired in an encoding procedure, directly to the video quality evaluation unit, and the video quality evaluation unit evaluates video quality using the decoded video data received from the decoding unit, and the auxiliary information received from the encoding unit.

2. The video quality evaluation system according to claim 1, wherein:

the source video input unit transmits the source video to the video quality evaluation unit, and the video quality evaluation unit evaluates video quality using the source video received from the source video input unit, the decoded video data received from the decoding unit, and the auxiliary information received from the encoding unit.

3. The video quality evaluation system according to claim 1, wherein:

the video transmitter further includes a feature extraction unit configured to extract feature parameters from the source video and transmitting the feature parameters to the video quality evaluation unit, the source video input unit provides the source video to the feature extraction unit, and the video quality evaluation unit evaluates video quality using the decoded video data received from the decoding unit, the feature parameters received from the feature extraction unit, and the auxiliary information received from the encoding unit.

4. The video quality evaluation system according to claim 1, wherein the auxiliary information includes at least one of codec type information, bit rate, Frames Per Second (FPS), location of each frame on a temporal axis, blocking level indicating discontinuity between adjacent blocks, motion amount, or residual error information for each frequency.

5. A system for evaluating video quality using auxiliary information of a codec, the system comprising a video receiver that includes a received data input unit configured to receive encoded video data over a network from a video transmitter, a decoding unit configured to generate received video by decoding the encoded video data, and a video quality evaluation unit configured to evaluate video quality using the decoded video, wherein:
the decoding unit transmits the auxiliary information required for video quality evaluation, among information acquired in a decoding procedure, directly to the video quality evaluation unit, and
the video quality evaluation unit evaluates video quality using the decoded video and the auxiliary information, which are received from the decoding unit.

6. The video quality evaluation system according to claim 5, wherein:
the video receiver further includes a source video input unit configured to provide source video to the video quality evaluation unit, and
the video quality evaluation unit evaluates video quality using the decoded video received from the decoding unit, the source video received from the source video input unit, and the auxiliary information.

7. The video quality evaluation system according to claim 5, wherein:
the video receiver further comprises a feature extraction unit configured to extract feature parameters from source video and transmitting the feature parameters to the video quality evaluation unit, and a source video input unit configured to provide the source video to the feature extraction unit, and
the video quality evaluation unit evaluates video quality using the decoded video received from the decoding unit, the feature parameters received from the feature extraction unit, and the auxiliary information.

8. The video quality evaluation system according to claim 5, wherein the auxiliary information includes at least one of codec type information, bit rate, Frames Per Second (FPS), location of each frame on a temporal axis, block location information, blocking level indicating discontinuity between adjacent blocks, motion amount, transmission bit information for each frequency, residual error information for each frequency, or transmission error information.

9. The video quality evaluation system according to claim 8, wherein the transmission error information includes at least one of bit error information, packet loss information, delay information, or jitter information.

10. A method of evaluating video quality using auxiliary information of a codec, in a video transmitter that includes a source video input unit, an encoding unit, a decoding unit, and a video quality evaluation unit configured to evaluate video quality using decoded video data and that evaluates video quality on a receiving side, the method comprising:
a first step of the source video input unit providing source video to the encoding unit;
a second step of the encoding unit encoding the source video, transmitting the encoded video data to the decoding unit, and transmitting the auxiliary information required for video quality evaluation, among information acquired in an encoding procedure, directly to the video quality evaluation unit;
a third step of the decoding unit decoding the encoded video data and transmitting the decoded video to the video quality evaluation unit; and
a fourth step of the video quality evaluation unit evaluating video quality using the decoded video and the auxiliary information.

11. The video quality evaluation method according to claim 10, wherein:
the first step is performed so that the source video input unit provides the source video both to the encoding unit and to the video quality evaluation unit, and
the fourth step is performed so that the video quality evaluation unit evaluates video quality using the source video, the decoded video, and the auxiliary information.

12. The video quality evaluation method according to claim 10, wherein:
the video transmitter further includes a feature extraction unit configured to extract feature parameters from the source video,
the first step is performed so that the source video input unit provides the source video both to the encoding unit and to the feature extraction unit, and
the fourth step is performed so that the video quality evaluation unit receives the feature parameters from the feature extraction unit and evaluates video quality using the feature parameters, the decoded video and the auxiliary information.

13. The video quality evaluation method according to claim 10, wherein, at the second step, the auxiliary information includes at least one of codec type information, bit rate, Frames Per Second (FPS), location of each frame on a temporal axis, blocking level indicating discontinuity between adjacent blocks, motion amount, or residual error information for each frequency.

14. A method of evaluating video quality using auxiliary information of a codec, in a video receiver that includes a received data input unit, a decoding unit, and a video quality evaluation unit configured to evaluate video quality using decoded video data, receives encoded video data from a video transmitter over a network, and evaluates video quality, comprising:
a first step of the received data input unit providing the encoded video data received over the network to the decoding unit;
a second step of the decoding unit generating received video by decoding the encoded video data, and transmitting auxiliary information required for video quality evaluation, among information acquired in a decoding procedure, directly to the video quality evaluation unit, together with the received video; and
a third step of the video quality evaluation unit evaluating video quality using the decoded video and the auxiliary information, which are received from the decoding unit.

15. The video quality evaluation method according to claim 14, wherein:
the video receiver further includes a source video input unit, and
the third step is performed so that the video quality evaluation unit receives source video from the source video input unit, and evaluates video quality using the decoded video received from the decoding unit, the source video, and the auxiliary information.

16. The video quality evaluation method according to claim 14, wherein:
the video receiver further includes a source video input unit, and a feature extraction unit configured to extract feature parameters from source video, and
the third step is performed so that the video quality evaluation unit receives the feature parameters from the feature extraction unit, and evaluates video quality using the decoded video received from the decoding unit, the feature parameters, and the auxiliary information.

17. The video quality evaluation method according to claim 14, wherein, at the second step, the auxiliary information includes at least one of codec type information, bit rate, Frames Per Second (FPS), location of each frame on a temporal axis, block location information, blocking level indicating discontinuity between adjacent blocks, motion amount, transmission bit information for each frequency, residual error information for each frequency, or transmission error information.

18. The video quality evaluation method according to claim 17, wherein the transmission error information includes at least one of bit error information, packet loss information, delay information, or jitter information.

* * * * *